United States Patent
Kubo

(10) Patent No.: US 7,053,950 B2
(45) Date of Patent: May 30, 2006

(54) DRIVE UNIT FOR TRANSFERRING CCD CHARGE

(75) Inventor: Naoki Kubo, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 721 days.

(21) Appl. No.: 10/176,047

(22) Filed: Jun. 21, 2002

(65) Prior Publication Data

US 2002/0196356 A1 Dec. 26, 2002

(30) Foreign Application Priority Data

Jun. 22, 2001 (JP) ............................ 2001-189845

(51) Int. Cl.
*H04N 3/14* (2006.01)
*H04N 5/335* (2006.01)

(52) U.S. Cl. .................................. 348/312; 348/211.14

(58) Field of Classification Search ................ 348/312, 348/343, 294, 296, 297, 207.11, 66, 335, 348/311, 313, 211.14; 370/535; 250/208.1; 713/500; 375/242

See application file for complete search history.

(56) References Cited

U.S. PATENT DOCUMENTS

| | | | | |
|---|---|---|---|---|
| 5,293,240 A | * | 3/1994 | Matsunaga | 348/312 |
| 5,422,670 A | * | 6/1995 | Fukui | 348/296 |
| 5,696,553 A | * | 12/1997 | D'Alfonso et al. | 348/211.14 |
| 5,986,702 A | * | 11/1999 | Maki | 348/241 |
| 6,005,629 A | * | 12/1999 | Douche et al. | 375/240.26 |
| 6,075,565 A | * | 6/2000 | Tanaka et al. | 348/312 |
| 6,477,184 B1 | * | 11/2002 | Ishikawa | 370/509 |
| 6,496,224 B1 | * | 12/2002 | Ueno | 348/322 |
| 6,856,352 B1 | * | 2/2005 | Kijima | 348/312 |

FOREIGN PATENT DOCUMENTS

| | | | |
|---|---|---|---|
| JP | 10042176 A | * | 2/1998 |
| JP | 2002-64753 | | 2/2002 |

* cited by examiner

*Primary Examiner*—Ngoc-Yen Vu
*Assistant Examiner*—Gregory V. Madden
(74) *Attorney, Agent, or Firm*—McGinn IP Law Group PLLC

(57) ABSTRACT

The number of terminals for a timing signal generating device and the vertical drive device for a solid-state image pickup element is to be reduced, and at the same time the circuit dimensions of the timing signal generating device and the vertical drive device which are increased by the reduction in the number of terminals are to be kept to the minimum. A timing signal generating circuit is provided with a time-division multiplexing circuit, and this time-division multiplexing circuit subjects timing signals vertical transfer pulses and timing signals for read pulses to time-division multiplexing. On the other hand, a vertical driver is provided with a demultiplexing circuit, and the demultiplexing circuit separates four-bit signals subjected to time-division multiplexing into the original timing signals and timing signals. This enables the number of terminals (the number of signal lines) of the timing signal generating circuit and the time-division multiplexing circuit to be reduced.

7 Claims, 7 Drawing Sheets

DRIVE UNIT FOR TRANSFERRING CCD CHARGE

BACKGROUND OF THE INVENTION

1. Field of the Invention

The present invention relates to a drive unit for transferring CCD charge, and more particularly to a reduction in the number of terminals between a timing signal generating circuit and the vertical driver of a solid-state image pickup element.

2. Description of the Related Art

FIG. 4 is a block diagram of an essential part of an image pickup unit including a drive unit for transferring CCD charge. As shown in this drawing, a solid-state image pickup element (e.g. a CCD image sensor) 10 accumulates signal charges for each pixel according to the incident luminous energy.

A timing signal generating circuit 12 supplies timing signals $V_{sig}$ and $H_{sig}$ to a vertical driver 14 and a horizontal driver 16, respectively. The vertical driver 14 generates vertical drive pulses $V_{dr}$ containing read pulses and vertical transfer pulses according to the entered timing signal $V_{sig}$, and supplies them to the vertical CCD shift register of the CCD image sensor 10. The horizontal driver 16 generates horizontal drive pulses $H_{dr}$ according to the entered timing signal $H_{sig}$, and supplies them to the horizontal CCD shift register of the CCD image sensor 10.

The signal charges accumulated in the CCD image sensor 10 are successively read out as CCD output signals, each of a voltage matching a signal charge, according to the vertical drive pulses $V_{dr}$ applied from the vertical (V) driver 14 and the horizontal drive pulses $H_{dr}$ applied from the horizontal driver 16.

The CCD output signals read out of the CCD image sensor 10 are applied to an analog front end (AFE) 18 via a capacitor C. The AFE 18, as shown in FIG. 5, has a CDS circuit 18A, an amplifier 18B and an A/D converter 18C among other elements. The CDS circuit 18A subjects entered CCD signals to correlation double sampling according to CDS pulses supplied from the timing signal generating circuit 12. The signals processed by the CDS circuit 18A, after being subjected to gain control by the amplifier 18B, is supplied to the A/D converter 18C. The A/D converter 18C converts the input signals, on a pixel-by-pixel basis, according to AD pulses supplied from the timing signal generating circuit 12.

Digital picture signals $A_{sig}$, having undergone pre-treatments including analog processing and A/D conversion by the AFE 18 are supplied as parallel data to a signal processing circuit 20 via a plurality of signal lines 19. The signal processing circuit 20 has a white balance circuit, a gamma correction circuit, a YC processing circuit and a compression-expansion circuit among other elements. After subjecting the picture signals $A_{sig}$ entered from the AFE 18 to digital processing in various manners, the signal processing circuit 20 records the processed signals on a storage medium (not shown).

FIG. 6 shows the conventional timing signal generating circuit 12 and the conventional V driver 14. As illustrated in the drawing, the timing signal generating circuit 12 supplies timing signals XV1 to XV4 for vertical transfer pulses and timing signals XTG1A, XTG1B, XTG3A and XTG3B for read pulses to the V driver 14 via a total of eight signal lines. Incidentally, its output actually includes power and SUB control signals in addition to these timing signals.

FIG. 7 is a timing chart showing an example of the timing signals XV1 to XV4 for the vertical transfer pulses and timing signals XTG1A, XTG1B, XTG3A and XTG3B for read pulses. FIG. 7 illustrates a case in which electric charges accumulated in a light receiving section matching a transfer gate TG1A (not shown) of the CCD 10 are read out to a vertical transfer path, and these read-out charges are transferred to a horizontal transfer path.

As shown in FIG. 7, when electric charges accumulated in the light receiving section matching the transfer gate TG1A are to be read out to the vertical transfer path, the timing signal XTG1A for read pulses is at an L level only during its read period $T_1$, and other timing signals XTG1B, XTG3A and XTG3B are at an H level. In this period, the timing signal XV1 for vertical transfer pulses is at the L level only during a period $T_2$ including the L level period $T_1$ of the timing signal XTG1A, when the timing signals XV2 and XV3 are at the L level and the timing signal XV4 is at the H level.

On the other hand, when these read-out charges are to be transferred to the horizontal transfer path, the timing signals XV1 to XV4 for vertical transfer pulses are shaped into a pulse waveform for four-phase driving of the vertical transfer path for the transferring, and all of the timing signals XTG1A, XTG1B, XTG3A and XTG3B for read pulses are then at the H level.

Referring back to FIG. 6, the V driver 14 has six drivers 14-1 to 14-6 for entering the timing signals XV1 to XV4 for the vertical transfer pulses and the timing signals XTG1A, XTG1B, XTG3A and XTG3B for read pulses. The drivers 14-1, 14-2, 14-4 and 14-5 supply one of three values (VH, VM and VL) according to the state of two inputs, while the drivers 14-3 and 14-6 supply one of two values (VM and VL) according to the state of one input.

FIG. 8 illustrates the output signals (vertical drive pulses V1A, V1B, V2, V3A, V3B and V4) of the six drivers 14-1 to 14-6 into which the timing signals XV1 to XV4 for vertical transfer pulses and the timing signals XTG1A, XTG1B, XTG3A and XTG3B for read pulses shown in FIG. 7 are to be entered.

As is well known, by applying a voltage VH, which is even higher than the voltage VM at the time of transfer, to an electrode matching the transfer gate of the CCD, charges accumulated in the light receiving section matching that transfer gate are read out to the vertical transfer path.

While the image pickup unit shown in FIG. 4 is integrated by providing the timing signal generating circuit 12 in the same semiconductor integrated circuit (IC) 22 as the AFE 18, it is necessary to provide in the IC 22 a group of terminals 26 for sending the timing signals $H_{sig}$ and $V_{sig}$ among others to circuits outward from the timing signal generating circuit 12 (the V driver 14 and the H driver 16), entailing the problem of an increased number of IC terminals.

In order to solve this problem, Japanese Patent Application No. 2000-246969 (which was, at the time the present invention was made, not published, not publically known, and assigned to the same assignee to which the present invention was subject to an obligation of assignment) proposes a drive unit for transferring CCD charge, in which the timing signal $V_{sig}$ is encoded with a view to reducing the number of terminals (the number of signal lines) for the timing signal generating circuit and the V driver.

However, the drive unit for transferring CCD charge in Japanese Patent Application No. 2000-246969 requires on-chip arrangement on the V driver side of a decoder for decoding the encoded timing signal, inviting the problem of an enlarged chip size. It is also necessary to mount on the timing signal generating circuit side a new encoder for encoding the timing signal, which means a factor to push up the cost.

SUMMARY OF THE INVENTION

The present invention, attempted in view of these circumstances, is intended to provide a drive unit for transferring CCD charge permitting a reduction in the number of terminals for a timing signal generating device and the vertical drive device for a solid-state image pickup element, and the minimization of the circuit dimensions of the timing signal generating device and the vertical drive device which are increased by the reduction in the number of terminals.

In order to achieve the above-described object, the present invention is directed to a drive unit which transfers CCD charge, comprising: a timing signal generating device which supplies a first group of timing signals and a second group of timing signals; and a vertical drive device which generates read pulses and vertical transfer pulses according to the first group of timing signals and second group of timing signals, respectively, and supplies the read pulses and vertical transfer pulses to a solid-state image pickup element, wherein: electric charges accumulated in a light receiving section of the solid-state image pickup element are read out to a vertical transfer path in response to the read pulses and the electric charges read out to the vertical transfer path are transferred to a horizontal transfer path in response to the vertical transfer pulses; the timing signal generating device comprises a time-division multiplexing device which multiplexes the first group of timing signals and second group of timing signals on a time-division basis, and sends the multiplexed signals to a common signal line provided between the timing signal generating device and the vertical drive device; and the vertical drive device comprises a demultiplexing device which separates the first group of timing signals and second group of timing signals that have been subjected to time-division multiplexing and received through the common signal line.

According to the present invention, by sharing on a time-division basis signal lines (terminals) to which the first group of timing signals for read pulses and the second group of timing signals for vertical transfer pulses of the solid-state image pickup element are supplied, the increase in the number of terminals on the semiconductor integrated circuit on which the timing signal generating device is mounted and on the semiconductor integrated circuit on which the vertical drive device is mounted is restrained.

Preferably, the time-division multiplexing device comprises a first switch device which supplies the first group of timing signals in a prescribed period during which the electric charges accumulated in the light receiving section of the solid-state image pickup element are read out to the vertical transfer path and supplies the second group of timing signals at other times than the prescribed period. More preferably, the first switch device is subjected to change-over control according to the first group of timing signals.

Preferably, the demultiplexing device has a second switch device which separates the group of timing signals entered from the time-division multiplexing device in the prescribed period during which the electric charges accumulated in the light receiving section of the solid-state image pickup element are read out to the vertical transfer path as the first group of timing signals and the group of timing signals entered from the time-division multiplexing device at other times than the prescribed period as the second group of timing signals, and supplies these groups of timing signals as such. More preferably, the second switch device is subjected to change-over control according to the first group of timing signals.

According to the present invention, since the time-division multiplexing unit and the demultiplexing unit comprise switch units, the circuit dimensions can be restrained to the minimum. Moreover, the first switch device and the second switch device can be subjected to change-over control according to the first group of timing signals, and accordingly there is no need to generate any special signal for controlling change-over.

Preferably, the demultiplexing device has a latch device for which holds, in the period during which the first group of timing signals, with change-over to the first group of timing signals taking place, are supplied from the second switch device, the output of the second group of timing signals immediately before the change-over to the first group of timing signals for output. This arrangement enables the second group of timing signals to be normally supplied even during the period in which the first group of timing signals, with change-over to this group taking place, are supplied from the second switch device.

Preferably, the demultiplexing device comprises a third switch device which changes over to and supplies one of the first group of timing signals supplied from the second switch device and a prescribed group of signals representing an output state of the first group of timing signals when the electric charges accumulated in the light receiving section of the solid-state image pickup element are not read out to the vertical transfer path; and the third switch device changes over to and supplies the prescribed group of signals when the first group of timing signals are not supplied from the second switch device. According to the present invention, because the first group of timing signals are in a prescribed output state when no read pulse is generated, they are switched over to the prescribed output state by the third switch device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A drive unit for transferring CCD charge according to an embodiment of the present invention will be described below with reference to the accompanying drawings.

Figure 1:
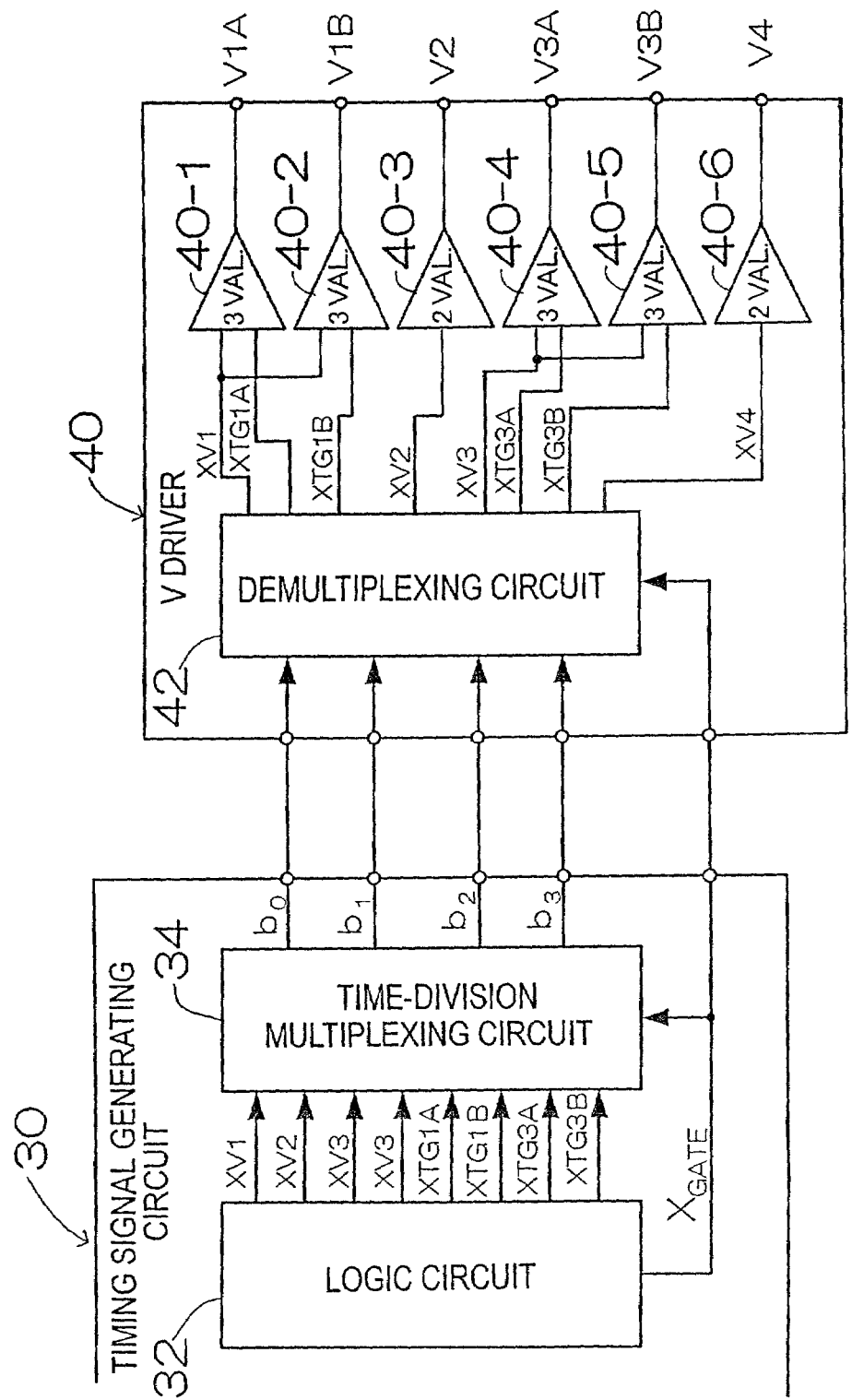
FIG. 1 shows a block diagram schematically illustrating a drive unit for transferring CCD charge according to the invention.

FIG. 1 is a block diagram schematically illustrating a drive unit for transferring CCD charge according to an embodiment of the present invention. This drive unit for transferring CCD charge comprises a timing signal generating circuit 30 and a vertical driver circuit (V driver) 40.

The timing signal generating circuit 30 and the V driver 40 are provided in separate semiconductor integrated circuits and, in this embodiment, are electrically connected to each other by five signal lines (five terminals).

Figure 6:
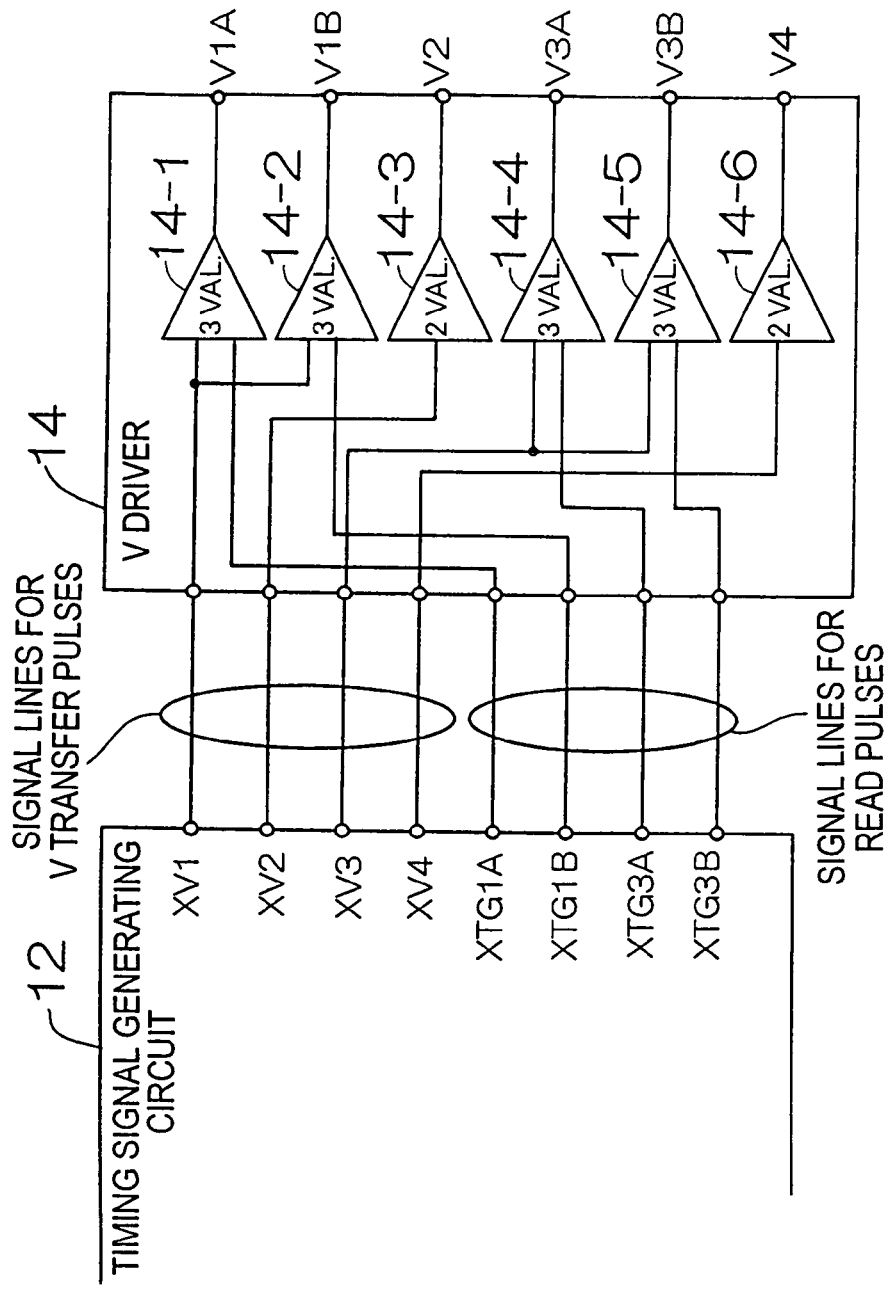
FIG. 6 shows a conventional timing signal generating circuit and a conventional V driver.

The timing signal generating circuit 30 differs from the conventional timing signal generating circuit 12 shown in FIG. 6 in that a time-division multiplexing circuit 34 is added, and the V driver 40 differs from the conventional V driver 14 shown in FIG. 6 in that a demultiplexing circuit 42 is added.

Figure 7:
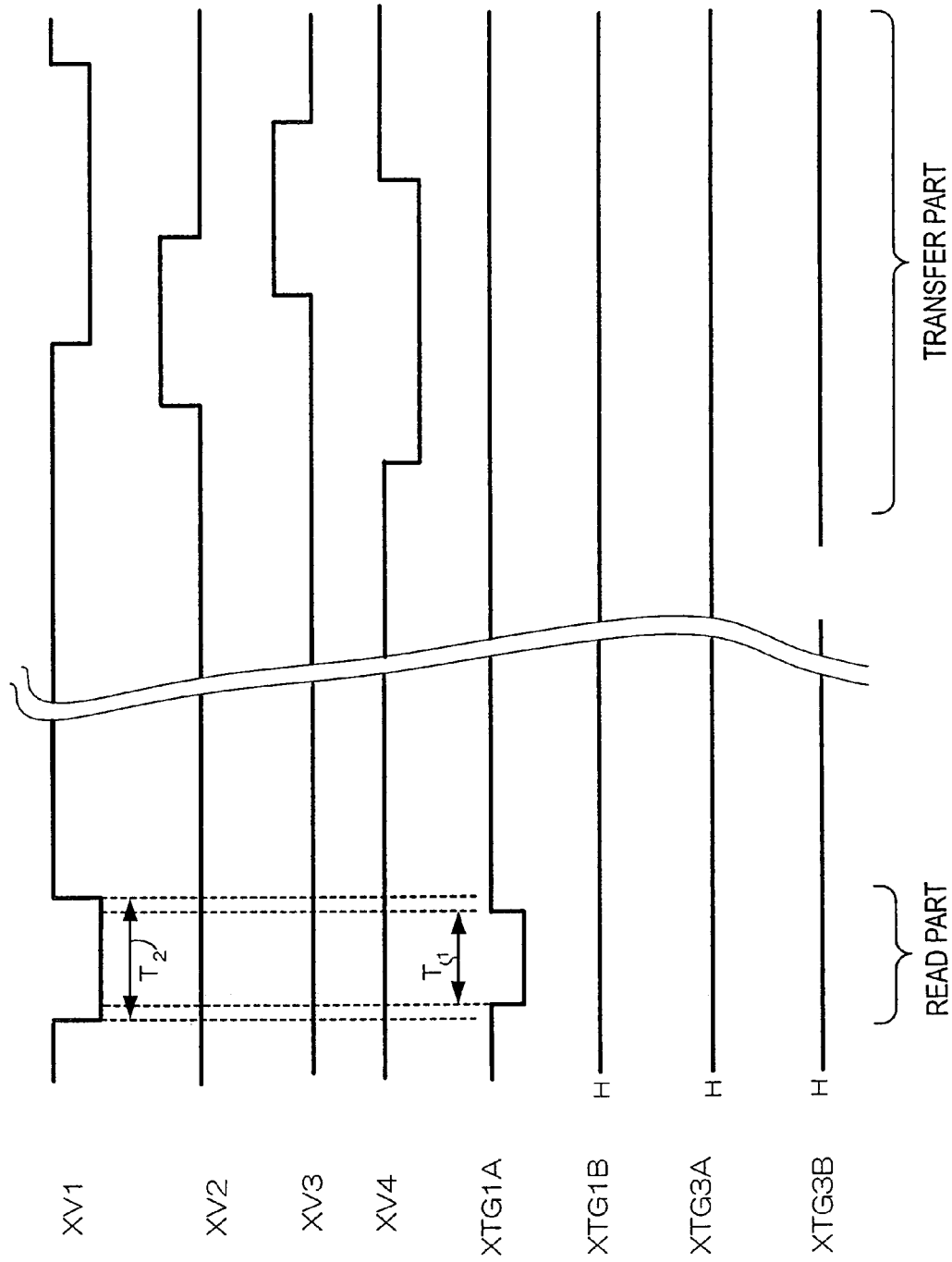
FIG. 7 is a timing chart showing an example of the timing signals for vertical transfer pulses and timing signals for read pulses.
Figure 8:
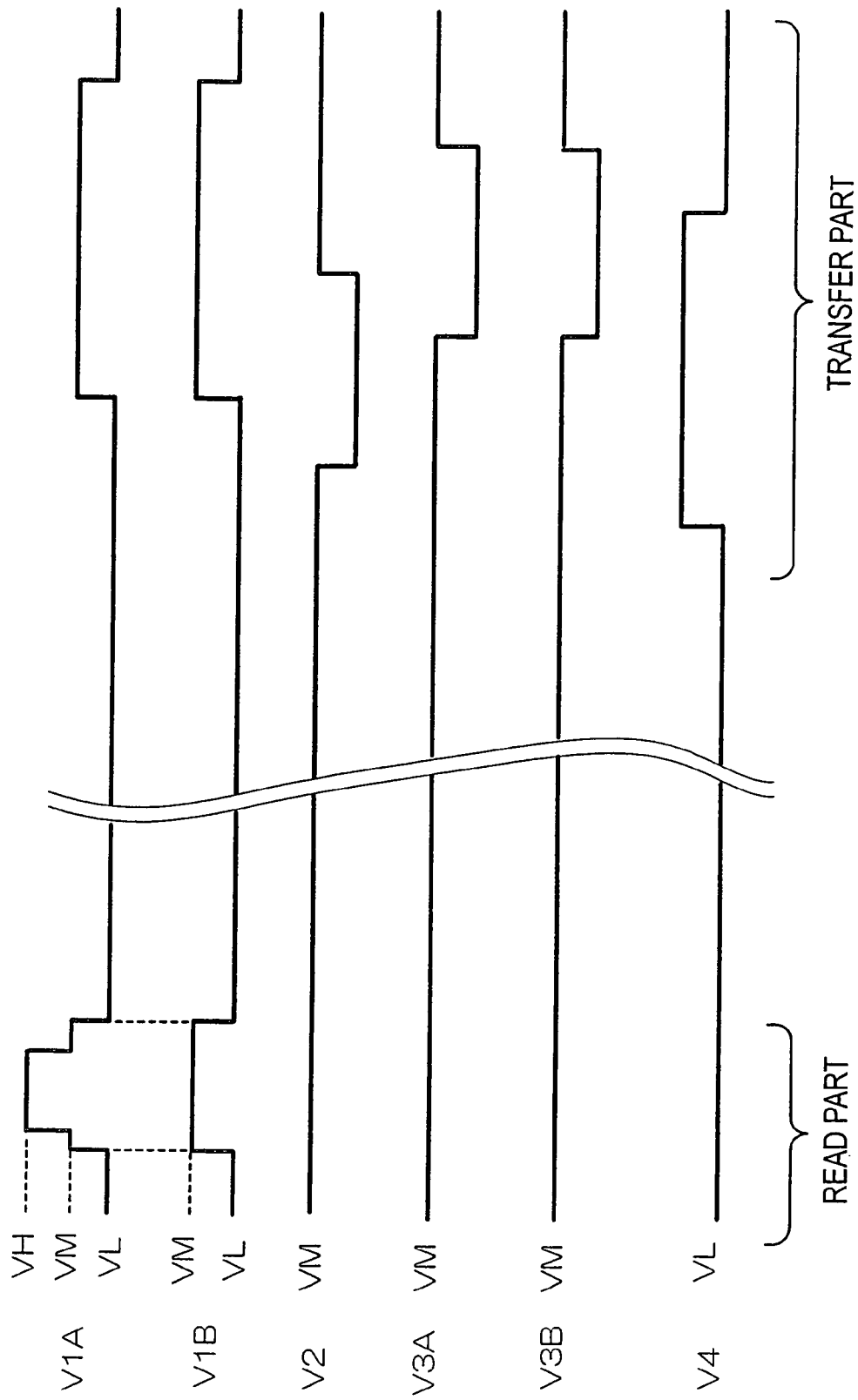
FIG. 8 is a waveform chart of vertical drive pulses supplied from the V driver.

A logic circuit 32 in the timing signal generating circuit 30 supplies the time-division multiplexing circuit 34 with timing signals XV1 to XV4 for vertical transfer pulses and timing signals XTG1A, XTG1B, XTG3A and XTG3B for read pulses, which are the same as the timing signals supplied from the conventional timing signal generating circuit 12 shown in FIG. 6. Incidentally, FIG. 7 shows an example of these timing signals XV1 to XV4 and timing signals XTG1A, XTG1B, XTG3A and XTG3B.

The logic circuit 32 also supplies a change-over signal $X_{GATE}$ for changing over between the timing signals XV1 to XV4 and the timing signals XTG1A, XTG1B, XTG3A and XTG3B. This change-over signal $X_{GATE}$ is obtained as an output signal of an AND circuit which subjects to AND processing four timing signals XTG1A, XTG1B, XTG3A and XTG3B entered into it, and is applied to the time-division multiplexing circuit 34 and the demultiplexing circuit 42.

Figure 2:
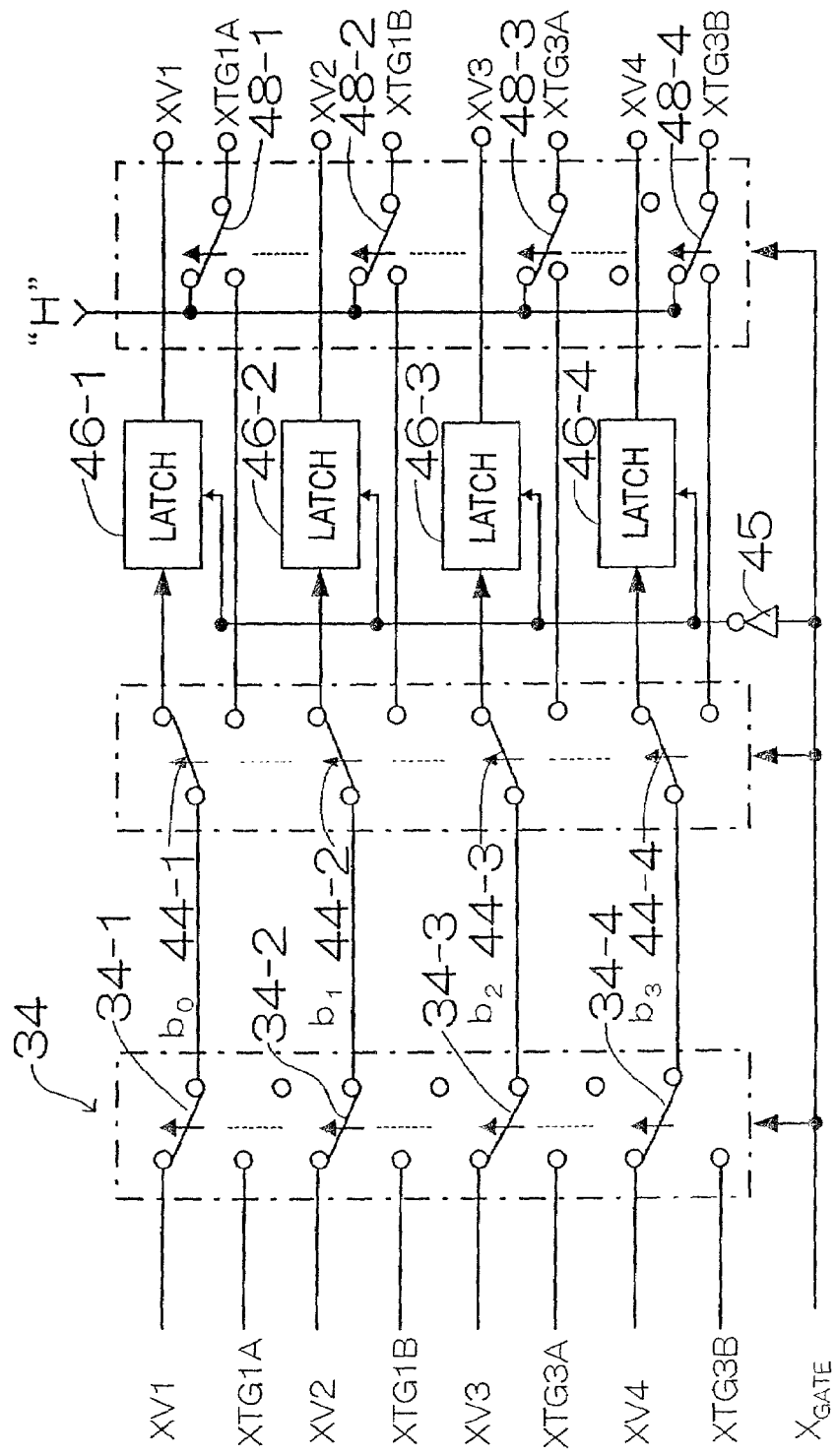
FIG. 2 is a circuit diagram illustrating an example of a time-division multiplexing circuit and a demultiplexing circuit shown in FIG. 1.

FIG. 2 is a circuit diagram illustrating an example of the time-division multiplexing circuit 34 and the demultiplexing circuit 42 shown in FIG. 1.

The time-division multiplexing circuit 34, as shown in FIG. 2, comprises first switch circuits 34-1 to 34-4, and the demultiplexing circuit 42 (as exemplarily illustrated in FIG. 1) comprises second switch circuits 44-1 to 44-4, latch circuits 46-1 to 46-4 and third switch circuits 48-1 to 48-4, as exemplarily illustrated in FIG. 2.

To the first switch circuits 34-1 to 34-4, second switch circuits 44-1 to 44-4 and third switch circuits 48-1 to 48-4 is applied a change-over signal $X_{GATE}$, and to latch circuits 46-1 to 46-4 is applied a signal resulting from inversion of the change-over signal $X_{GATE}$ via an inverter 45.

These first switch circuits 34-1 to 34-4, second switch circuits 44-1 to 44-4 and third switch circuits 48-1 to 48-4 are subjected to change-over control with the change-over signal $X_{GATE}$, and the latch circuits 46-1 to 46-4 hold or pass input signals according to the inverted signal of the change-over signal $X_{GATE}$.

Thus, the first switch circuits 34-1 to 34-4 supply the timing signals XV1 to XV4 for vertical transfer pulses while the change-over signal $X_{GATE}$ of the H level is being entered and the timing signals XTG1A, XTG1B, XTG3A and XTG3B for read pulses while the change-over signal $X_{GATE}$ of the L level is being entered as will be described below. The second switch circuits 44-1 to 44-4 supply the entered timing signals to the latch circuits 46-1 to 46-4 while the change-over signal $X_{GATE}$ of the H level is being entered and the third switch circuits 48-1 to 48-4 while the change-over signal $X_{GATE}$ of the L level is being entered.

The latch circuits 46-1 to 46-4, when an inverted signal of the H level is entered, hold the entered from the second switch circuits 44-1 to 44-4 immediately before that or, when an inverted signal of the L level is entered, clears the holding and pass the timing signal entered from the second switch circuits 44-1 to 44-4 as it is. To add, it is preferable to provide an appropriate delaying device so that the latch circuits 46-1 to 46-4 can hold the output signals of the second switch circuits 44-1 to 44-4 immediately before they undergo change-over control.

To one-side inputs of the third switch circuits 48-1 to 48-4 are applied signals representing the output states of the timing signals XTG1A, XTG1B, XTG3A and XTG3B in the period during which the charges accumulated in the light receiving section of the CCD are not read out to the vertical transfer path (all of which are signals of the H level in this embodiment), and to the other-side inputs are applied the output signals of the second switch circuits 44-1 to 44-4. The third switch circuits 48-1 to 48-4 supply input signals on one side (all of which are signals of the H level) while the change-over signal $X_{GATE}$ of the H level is being entered and the timing signals entered from the second switch circuits 44-1 to 44-4 while the change-over signal $X_{GATE}$ of the L level is being entered.

Incidentally, the first, second and third switch circuits are configured of gate circuits using transistors.

Next will be explained the operation of the drive unit for transferring CCD charge configured as described above with reference to the timing charts of FIG. 3 and FIG. 7.

Figure 3:
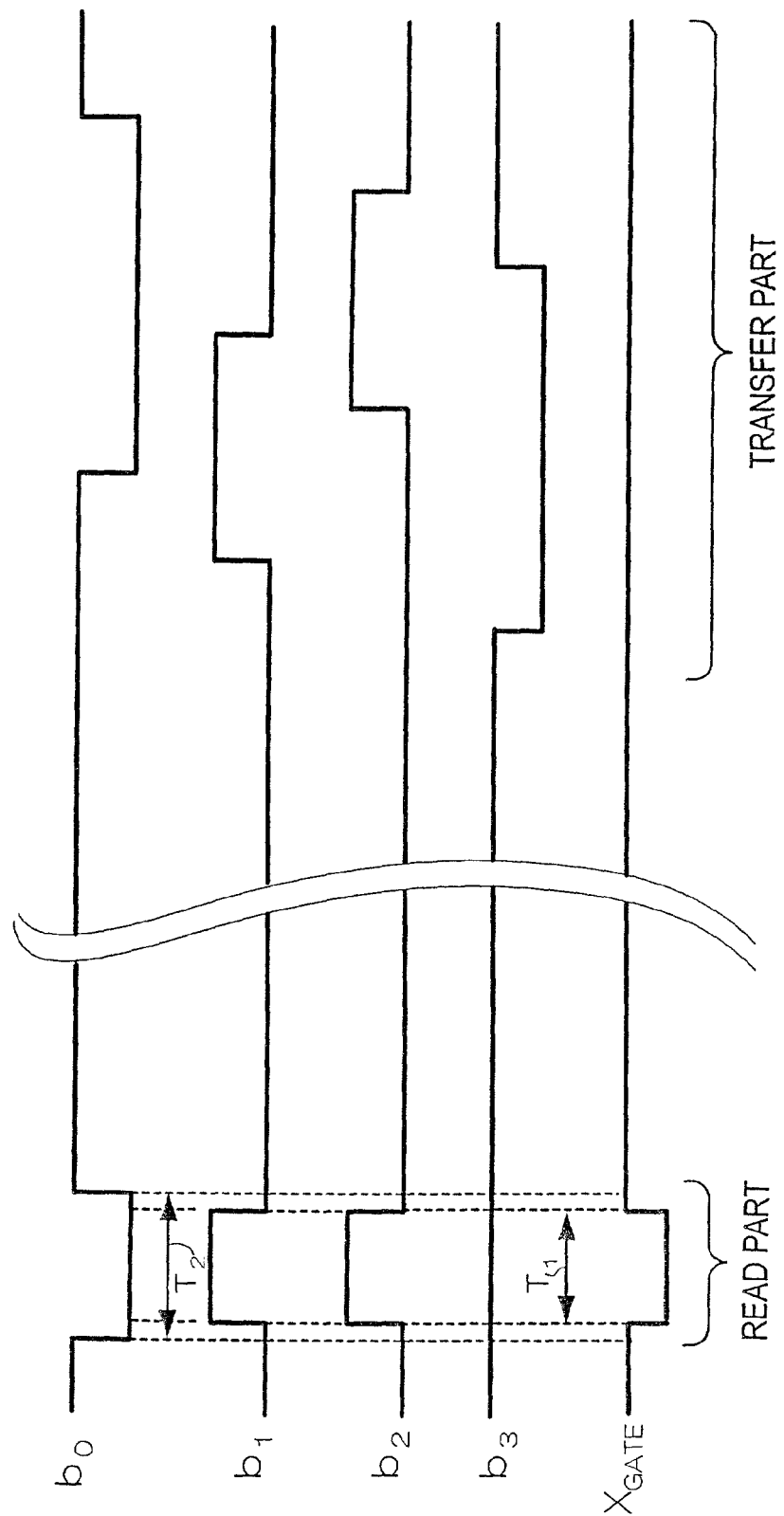
FIG. 3 is a timing chart for describing the time-division multiplexing of timing signals.
Figure 4:
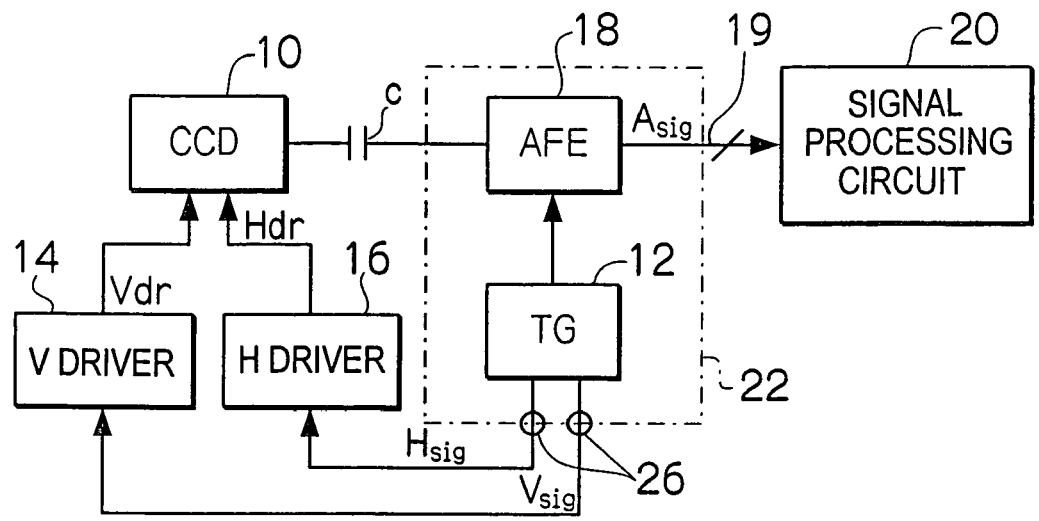
FIG. 4 is a block diagram of an essential part of an image pickup unit including a conventional drive unit for transferring CCD charge.
Figure 5:
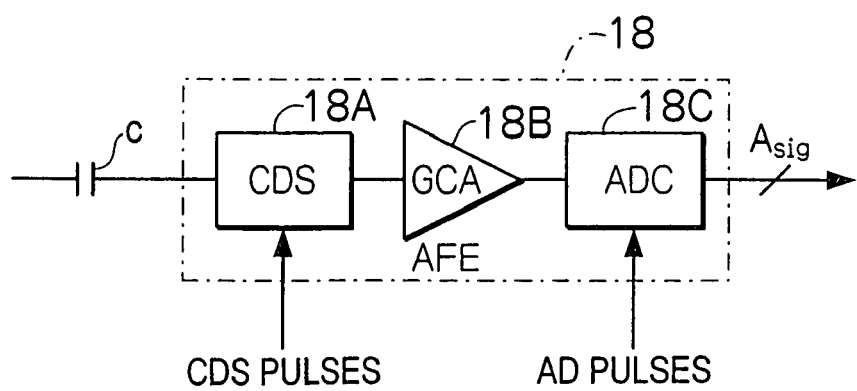
FIG. 5 is a block diagram illustrating an example of internal configuration of the AFE shown in FIG. 4.

To the first switch circuits 34-1 to 34-4 shown in FIG. 2 are entered the timing signals XV1 to XV4 for vertical transfer pulses and the timing signals XTG1A, XTG1B, XTG3A and XTG3B for read pulses shown in FIG. 7. As illustrated in FIG. 3, when the change-over signal $X_{GATE}$ of the L level is entered, the timing signals XTG1A, XTG1B, XTG3A and XTG3B are supplied as four-bit signals $b_0$ to $b_3$, and when the change-over signal $X_{GATE}$ of the H level is entered, the timing signals XV1 to XV4 are supplied as signals $b_0$ to $b_3$.

Here, the change-over signal $X_{GATE}$ is a signal prepared by subjecting the four timing signals XTG1A, XTG1B, XTG3A and XTG3B to AND processing as described above, and they take on the L level only when the charges accumulated in the light receiving section of the CCD are read out to the vertical transfer path. In the present embodiment, the change-over signal $X_{GATE}$ is the same signal as the timing signal XTG1A, which takes on the L level only during the read period $T_1$.

Therefore, the first switch circuits 34-1 to 34-4 change over their outputs between the timing signals XV1 to XV4 for vertical transfer pulses and the timing signals XTG1A, XTG1B, XTG3A and XTG3B for read pulses according to whether the level of the change-over signal $X_{GATE}$ is H or L. The timing signals XV1 to XV4 and the timing signals XTG1A, XTG1B, XTG3A and XTG3B are thereby subjected to time-division multiplexing, and enabled to share common terminals (signal lines) on a time-division basis.

On the other hand, the four-bit signals $b_0$ to $b_3$ subjected to time-division multiplexing as described above are applied to the second switch circuits 34-1 to 34-4, wherein they are separated. Thus, the second switch circuits 34-1 to 34-4 supply the latch circuits 46-1 to 46-4 with the signals $b_0$ to $b_3$ entered while the change-over signal $X_{GATE}$ of the H level is being entered (the timing signals XV1 to XV4), and supply the third switch circuits 48-1 to 48-4 with the signals $b_0$ to $b_3$ entered while the change-over signal $X_{GATE}$ of the L level is being entered (the timing signals XTG1A, XTG1B, XTG3A and XTG3B).

The latch circuits 46-1 to 46-4 pass as they are the timing signals XV1 to XV4 when the timing signals XV1 to XV4 are entered from the second switch circuits 34-1 to 34-4 in response to the change-over signal $X_{GATE}$ of the H level instead of holding the input signals with the inverted signal of this change-over signal $X_{GATE}$ of the H level, while they hold the timing signals XV1 to XV4 entered immediately before in response to the change-over signal $X_{GATE}$ of the L level when the timing signals XV1 to XV4 are not entered from the second switch circuits 34-1 to 34-4 in response to this change-over signal $X_{GATE}$ of the L level. The latch circuits 46-1 to 46-4 thereby supply the timing signals XV1 to XV4 for vertical transfer pulses shown in FIG. 7.

The third switch circuits 48-1 to 48-4 signals of the H level alone (signals representing the output states of the timing signals XTG1A, XTG1B, XTG3A and XTG3B in the period during which the charges accumulated in the light receiving section of the CCD are not read out to the vertical transfer path) when the timing signals XTG1A, XTG1B, XTG3A and XTG3B are not entered from the second switch circuits 34-1 to 34-4 in response to the change-over signal $X_{GATE}$ of the H level, while they supply these timing signals XTG1A, XTG1B, XTG3A and XTG3B when the timing signals XTG1A, XTG1B, XTG3A and XTG3B are entered from the second switch circuits 34-1 to 34-4 in response to the change-over signal $X_{GATE}$ of the L level. As a result, the third switch circuits 48-1 to 48-4 supply the timing signals XTG1A, XTG1B, XTG3A and XTG3B for read pulses shown in FIG. 7.

As described above, the timing signals XV1 to XV4 for vertical transfer pulses and the timing signals XTG1A, XTG1B, XTG3A and XTG3B for read pulses supplied from the demultiplexing circuit 42 comprising the second switch circuits 44-1 to 44-4, latch circuits 46-1 to 46-4 and third switch circuits 48-1 to 48-4 are applied to drivers 40-1 to 40-6, respectively, as illustrated in FIG. 1.

These drivers 40-1 to 40-6, in the same way as the drivers 14-1, 14-2, 14-4 and 14-5 shown in FIG. 6, generate vertical drive pulses V1A, V1B, V2, V3A, V3B and V4, and supply them to electrodes on the vertical transfer path of the CCD. Although the description of this mode of implementation supposes that there are four each of timing signals XV1 to XV4 for vertical transfer pulses and timing signals XTG1A, XTG1B, XTG3A and XTG3B for read pulses, the number of timing signals for vertical transfer pulses and that of timing signals for read pulses are not limited to these. Also the number of timing signals for vertical transfer pulses and that of timing signals for read pulses need not to be identical, and if they are not identical, there will be provided as many dedicated terminals (signal lines) not shared on a time-division basis as the difference in the number of timing signals.

As hitherto described, according to the present invention, the numbers of terminals on the IC on which the timing signal generating device is mounted and on the IC on which the vertical drive device is mounted can be restrained, because signal lines (terminals) to which the group of timing signals for read pulses of the solid-state image pickup element and the group of timing signals for vertical transfer pulses are shared on a time-division basis. Furthermore, the devices for time-division multiplexing and demultiplexing can be configured of switching devices or the like, the circuit dimensions of the timing signal generating device and the vertical drive device expanded on account of the reduction in the number of terminals can be kept to the minimum.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A drive unit which transfers CCD charge, comprising:
a timing signal generating device which supplies a first group of timing signals and a second group of timing signals; and
a vertical drive device which generates read pulses and vertical transfer pulses according to the first group of timing signals and second group of timing signals, respectively, and supplies the read pulses and vertical transfer pulses to a solid-state image pickup element, wherein:
electric charges accumulated in a light receiving section of the solid-state image pickup element are read out to a vertical transfer path in response to the read pulses and the electric charges read out to the vertical transfer path are transferred to a horizontal transfer path in response to the vertical transfer pulses;
the timing signal generating device comprises a time-division multiplexing device which multiplexes the first group of timing signals and second group of timing signals corresponding to the change-over signal generated in accordance with the first timing signals on a time-division basis, and sends the multiplexed signals to a common signal line provided between the timing signal generating device and the vertical drive device; and
the vertical drive device comprises a demultiplexing device which separates the first group of timing signals and second group of timing signals that have been subjected to time-division multiplexing and received through the common signal line.

2. A drive unit which transfers CCD charge, comprising:
a timing signal generating device which supplies a first group of timing signals and a second group of timing signals; and
a vertical drive device which generates read pulses and vertical transfer pulses according to the first group of timing signals and second group of timing signals, respectively, and supplies the read pulses and vertical transfer pulses to a solid-state image pickup element, wherein:
electric charges accumulated in a light receiving section of the solid-state image pickup element are read out to a vertical transfer path in response to the read pulses and the electric charges read out to the vertical transfer path are transferred to a horizontal transfer path in response to the vertical transfer pulses;
the timing signal generating device comprises a time-division multiplexing device which multiplexes the first group of timing signals and second group of timing signals on a time-division basis, and sends the multiplexed signals to a common signal line provided between the timing signal generating device and the vertical drive device; and
the vertical drive device comprises a demultiplexing device which separates the first group of timing signals and second group of timing signals that have been subjected to time-division multiplexing and received through the common signal line, and
wherein the time-division multiplexing device comprises a first switch device which supplies the first group of timing signals in a prescribed period during which the electric charges accumulated in the light receiving section of the solid-state image pickup element are read out to the vertical transfer path and supplies the second group of timing signals at other times than the prescribed period.

3. The drive unit according to claim 2, wherein the first switch device is subjected to change-over control according to the first group of timing signals.

4. A drive unit which transfers CCD charge, comprising:
a timing signal generating device which supplies a first group of timing signals and a second group of timing signals; and
a vertical drive device which generates read pulses and vertical transfer pulses according to the first group of timing signals and second group of timing signals, respectively, and supplies the read pulses and vertical transfer pulses to a solid-state image pickup element, wherein:

electric charges accumulated in a light receiving section of the solid-state image pickup element are read out to a vertical transfer path in response to the read pulses and the electric charges read out to the vertical transfer path are transferred to a horizontal transfer path in response to the vertical transfer pulses;

the timing signal generating device comprises a time-division multiplexing device which multiplexes the first group of timing signals and second group of timing signals on a time-division basis, and sends the multiplexed signals to a common signal line provided between the timing signal generating device and the vertical drive device; and the vertical drive device comprises a demultiplexing device which separates the first group of timing signals and second group of timing signals that have been subjected to time-division multiplexing and received through the common signal line, and wherein the demultiplexing device includes a second switch device which separates the group of timing signals entered from the time-division multiplexing device in the prescribed period during which the electric charges accumulated in the light receiving section of the solid-state image pickup element are read out to the vertical transfer path as the first group of timing signals and the group of timing signals entered from the time-division multiplexing device at other times than the prescribed period as the second group of timing signals, and supplies these groups of timing signals as such.

5. The drive unit according to claim 4, wherein the second switch device is subjected to change-over control according to the first group of timing signals.

6. A drive unit which transfers CCD charge, comprising:

a timing signal generating device which supplies a first group of timing signals and a second group of timing signals; and a vertical drive device which generates read pulses and vertical transfer pulses according to the first group of timing signals and second group of timing signals, respectively, and supplies the read pulses and vertical transfer pulses to a solid-state image pickup element, wherein:

electric charges accumulated in a light receiving section of the solid-state image pickup element are read out to a vertical transfer path in response to the read pulses and the electric charges read out to the vertical transfer path are transferred to a horizontal transfer path in response to the vertical transfer pulses;

the timing signal generating device comprises a time-division multiplexing device which multiplexes the first group of timing signals and second group of timing signals on a time-division basis, and sends the multiplexed signals to a common signal line provided between the timing signal generating device and the vertical drive device; and the vertical drive device comprises a demultiplexing device which separates the first group of timing signals and second group of timing signals that have been subjected to time-division multiplexing and received through the common signal line, wherein the demultiplexing device includes a latch device which holds the output of the second group of timing signals immediately before the change-over to the first group of timing signals for output, and wherein said latch device holds the output of the second group of timing signals in the period during which the first group of timing signals, with change-over to the first group of timing signals taking place, are supplied from the second switch devices.

7. A drive unit which transfers CCD charge, comprising:

a timing signal generating device which supplies a first group of timing signals and a second group of timing signals; and a vertical drive device which generates read pulses and vertical transfer pulses according to the first group of timing signals and second group of timing signals, respectively, and supplies the read pulses and vertical transfer pulses to a solid-state image pickup element, wherein:

electric charges accumulated in a light receiving section of the solid-state image pickup element are read out to a vertical transfer path in response to the read pulses and the electric charges read out to the vertical transfer path are transferred to a horizontal transfer path in response to the vertical transfer pulses;

the timing signal generating device comprises a time-division multiplexing device which multiplexes the first group of timing signals and second group of timing signals on a time-division basis, and sends the multiplexed signals to a common signal line provided between the timing signal generating device and the vertical drive device; and the vertical drive device comprises a demultiplexing device which separates the first group of timing signals and second group of timing signals that have been subjected to time-division multiplexing and received through the common signal line, and wherein:

the demultiplexing device comprises a third switch device which changes over to and supplies one of the first group of timing signals supplied from the second switch device and a prescribed group of signals representing an output state of the first group of timing signals when the electric charges accumulated in the light receiving section of the solid-state image pickup element are not read out to the vertical transfer path; and the third switch device changes over to and supplies the prescribed group of signals when the first group of timing signals are not supplied from the second switch device.

* * * * *